Figure 1:
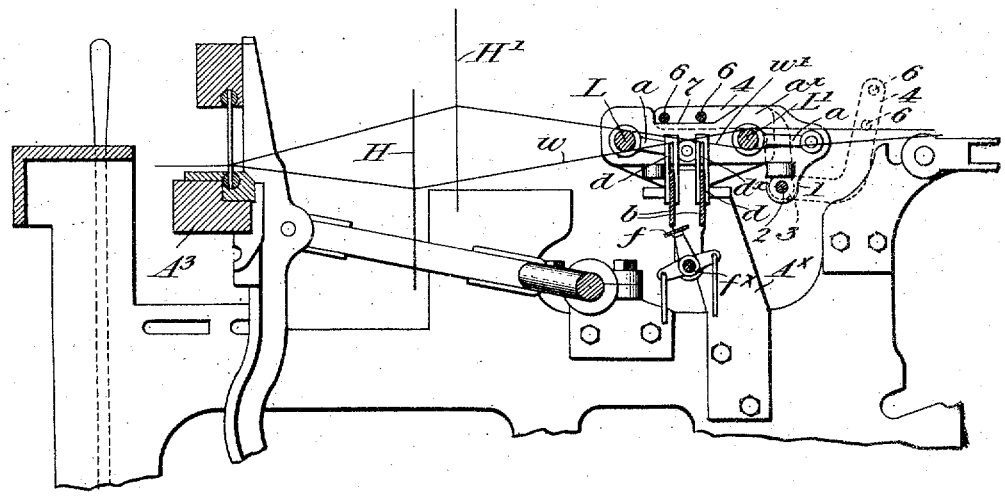

No. 12,830. REISSUED JULY 14, 1908.

A. E. RHOADES.

WARP STOP MOTION FOR LOOMS.

APPLICATION FILED JUNE 8, 1908.

Witnesses:
Edward F. Allen.
Thomas L. Drummond.

Inventor,
Alonzo E. Rhoades,
by Hornby Gregory
Atty.

UNITED STATES PATENT OFFICE.

ALONZO E. RHOADES, OF HOPEDALE, MASSACHUSETTS, ASSIGNOR TO DRAPER COMPANY, OF HOPEDALE, MASSACHUSETTS, A CORPORATION OF MAINE.

WARP STOP-MOTION FOR LOOMS.

No. 12,830. Specification of Reissued Letters Patent. Reissued July 14, 1908.

Original No. 887,425, dated May 12, 1908, Serial No. 389,927. Application for reissue filed June 8, 1908. Serial No. 437,450.

*To all whom it may concern:*

Be it known that I, ALONZO E. RHOADES, a citizen of the United States, and resident of Hopedale, county of Worcester, State of Massachusetts, have invented an Improvement in Warp Stop-Motions for Looms, of which the following description, in connection with the accompanying drawing, is a specification, like letters on the drawing representing like parts.

This invention relates to warp-stop-motion devices for looms, particularly of the type wherein drop devices or controlling-detectors of the so-called "hair-pin" type are employed, and it has for its especial object the production of novel and efficient means to prevent displacement of the drop devices during the weaving operation.

I have so constructed the apparatus that the means for limiting the upward movement or jumping of the detectors can be readily moved by the weaver into inoperative position when it is necessary to piece up a warp-thread or remove or replace a detector. Should the weaver omit to replace the limiting means when weaving is resumed such means will be automatically returned to such operative position.

The various novel features of my invention will be fully described in the subjoined specification and particularly pointed out in the following claims.

Figure 2:
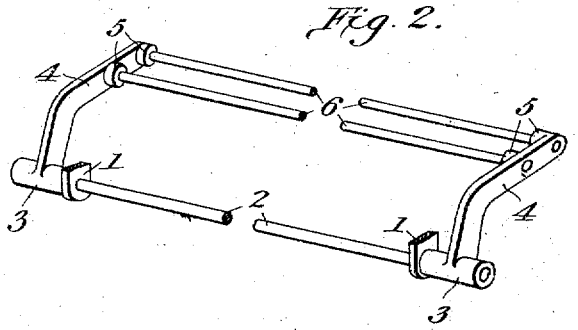

Figure 1 is a transverse sectional view of a sufficient portion of a loom, with a warp-stop-motion applied thereto embodying one form of my present invention; Fig. 2 is a perspective view, centrally broken out, of the limiting means, detached.

Referring to Fig. 1 the lay $A^3$, harnesses H, H′, lease-rods L, L′ supported at their ends on arms *a* fulcrumed in brackets $a^\times$ secured each to a stand $A^\times$ on each loom-side, and the drop devices or controlling detectors *d*, may be and are of any usual or well known construction.

Each detector may be conveniently made of thin, flat sheet-metal longitudinally slotted at $d^\times$ from its lower end upward, to hang suspended from a warp-thread, and herein I have shown two banks or series of detectors, hung respectively on the two divisions *w*, *w′* of the warp between the lease-rods in front and behind the crossing point of the threads. Upright detector supports *b*, *b* extend loosely through the detector slots $d^\times$ and are held at their ends in the brackets $a^\times$, the detectors being freely movable vertically on the supports in usual manner. A double-stroke feeler *f* mounted on a rock-shaft $f^\times$ is vibrated in a path just below the supports, to engage and be arrested by a released detector in either series, the normal vibration of the feeler being effected by any suitable mechanism, not shown, such for instance as that illustrated in United States Patent No. 673824 granted May 7, 1901 to Stimpson. As the lower ends of the detector slots $d^\times$ are open the detectors are free to move upward on the supports *b* and sometimes the action of the warp will cause one or more of the detectors to jump high enough to be thrown off its warp-thread or off its support. This jumping is also liable to occur when the loom is at rest and the weaver is picking out.

I have herein provided novel and effective means for limiting the upward movement of the detectors from any cause. Each of the brackets $a^\times$ has at its rear end a depending ear 1, Figs. 1 and 2, through which is extended loosely a rod 2 below the warp and having its ends project beyond the ears, and on each of such ends is secured the hub 3 of an upturned and forwardly bent arm 4. Bosses 5 are formed on the inner faces of the free ends of the arms, to receive stop-rods or members 6, which are equal in number to the banks of detectors *d*, two of the stop members being herein shown. The arms 4 swing upon the rod 2 as a fulcrum, and when said arms are swung forward into operative position, see full lines Fig. 1, the stop members 6 are located above the warp and over the upper ends of the series of detectors. At such time the stop members 6 rest upon the tops of the brackets $a^\times$, the latter being shaped to present a rest 7 therefor Fig. 1. It will be obvious that while the detectors have some upward movement it is limited by the stop members, so that it is impossible for any detector to rise high enough to become displaced on either its warp-thread or its support *b*, no matter how sharp or violent may be the vibration of the warp-threads.

When piecing-up is necessary, or a detector is to be removed or replaced, the weaver swings up and back into dotted line position, Fig. 1, the arms 4, which constitute a swinging carrier for the limiting or stop members 6, leaving the warp perfectly unobstructed in the vicinity of the detectors, so that any fault can be easily and quickly corrected. The carrier is held in dotted line position by the warp engaging one of the limiting members 6. When the fault is corrected the weaver should return the carrier to operative position, but if this should be neglected the movement of the warp itself will very quickly act upon the carrier and swing it upward over dead center, so that it will automatically drop down into full-line operative position, Fig. 1.

It will be understood that the automatic positioning of the limiting members is due to the alternate slackening and tightening of the warp, imparting a series of blows upon the engaged one of the rods 6 and setting up a jumping or rocking movement in the carrier, and as the latter is of relatively light weight and not far past dead center when in inoperative position, the movement thus imparted results in a very short time in the automatic positioning of the device.

My invention is not restricted to the precise construction and arrangement herein shown and described, as the same may be modified in various particulars by those skilled in the art without departing from the spirit and scope of my invention as set forth in the annexed claims.

Having fully described my invention, what I claim as new and desire to secure by Letters Patent is:—

1. In a warp stop-motion for looms, in combination, a series of vertically movable detectors each suspended from a single warp thread, and a swinging device to normally limit upward movement of the detectors, said device being fulcrumed below the warp and manually movable into inoperative position upon the warp back of and above the fulcrum, to permit ready access to the detectors, the alternate tightening and slackening of the warp serving to automatically swing said device past dead center and forward to operative position when the operation of the loom is resumed.

2. In a warp-stop-motion for looms, in combination, a plurality of series of vertically-movable detectors each suspended from a single warp-thread, a swinging carrier fulcrumed below the warp and provided with a stop member for each series of detectors, and means to position the carrier with the stop members above and to limit upward movement of the detectors, said carrier being manually movable into inoperative position to permit ready access to the detectors, one of the stop members at such time resting upon the warp back of and above the fulcrum of the carrier.

3. In a warp-stop-motion for looms, in combination, a plurality of series of vertically-movable detectors each suspended from a single warp-thread, a swinging carrier fulcrumed below the warp and provided with a stop member for each series of detectors, and means to position the carrier with the stop members above and to limit upward movement of the detectors, said carrier being manually movable into inoperative position with one of the stop members resting upon the warp back of and above the carrier fulcrum, the alternate tightening and slackening of the warp acting to automatically return the carrier to operative position when the loom is in operation.

4. In a warp-stop-motion for looms, a plurality of series of vertically movable detectors each suspended from a single warp-thread, fixed supports on which the detectors move, a pair of arms fulcrumed at opposite sides of the loom behind the detectors and below the warps, transverse stop-rods mounted on the free ends of the arms, to normally extend above the series of detectors and limit their upward movement, and rests to engage and maintain the stop-rods in such position, said arms being swung rearward manually to bring one of the stop rods into engagement with the warp and to rest thereon when access is to be had to the detectors, the movement of the warp when the loom is in motion acting to automatically swing forward the arms past dead center and position the stop-rods with relation to the detectors.

5. In a warp-stop-motion for looms, in combination, a series of vertically movable detectors each suspended from a single warp-thread, a swinging carrier pivotally mounted behind the detectors and below the warp and movable rearwardly manually into inoperative position, and means on the carrier to limit upward movement of the detectors when said carrier is operatively positioned, said means resting on the warp when the carrier is in its inoperative position, the action of the warp upon said means serving to insure automatically the return of the carrier to operative position when the operation of the loom is resumed.

In testimony whereof, I have signed my name to this specification, in the presence of two subscribing witnesses.

ALONZO E. RHOADES.

Witnesses:
FRANK J. DUTCHER
F. C. HODGMAN.